US011579586B2

(12) United States Patent
Aldabbagh et al.

(10) Patent No.: US 11,579,586 B2
(45) Date of Patent: Feb. 14, 2023

(54) ROBOT DISPATCH AND REMEDIATION OF LOCALIZED METAL LOSS FOLLOWING ESTIMATION ACROSS PIPING STRUCTURES

(71) Applicant: Saudi Arabian Oil Company, Dhahran (SA)

(72) Inventors: Ahmad Aldabbagh, Thuwal (SA); Sahejad Patel, Thuwal (SA); Hassane Trigui, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 263 days.

(21) Appl. No.: 16/587,329

(22) Filed: Sep. 30, 2019

(65) Prior Publication Data

US 2021/0096529 A1 Apr. 1, 2021

(51) Int. Cl.
*B25J 9/16* (2006.01)
*G06N 3/08* (2006.01)
(Continued)

(52) U.S. Cl.
CPC ............ *G05B 19/406* (2013.01); *B25J 9/162* (2013.01); *B25J 9/1664* (2013.01); *B25J 9/1674* (2013.01);
(Continued)

(58) Field of Classification Search
CPC ...... B25J 9/162; B25J 11/0075; B25J 9/1664; B25J 9/1674; B25J 9/1679; G05B 19/406;
(Continued)

(56) References Cited

U.S. PATENT DOCUMENTS 10,072,800 B1 * 9/2018 Logan .................. E03F 7/00
2007/0168923 A1 * 7/2007 Connor ................ G06F 30/00
717/104
(Continued)

FOREIGN PATENT DOCUMENTS

CN 109034546 A 12/2018
CN 109800824 A 5/2019
(Continued)

OTHER PUBLICATIONS

Silakorn et al., "The Application of ANN Artificial Neural Network to Pipeline TOLC Metal Loss Database", Nov. 14-16, 2016, International Petroleum Technology Conference, IPTC-18658-MS (Year: 2016).*

(Continued)

*Primary Examiner* — Khoi H Tran
*Assistant Examiner* — Tanner L Cullen
(74) *Attorney, Agent, or Firm* — Leason Ellis LLP

(57) ABSTRACT

A method according to the disclosure configures a processor to predict metal loss in a structure for remediation. The method uses a machine learning model, trained based upon historical data, to predict metal loss over locations of a structure at a time of the prediction. The method identifies from among the predicted locations a high-risk location on the structure in which a magnitude of metal loss indicates potential remediation being needed, dispatches a robotic vehicle to the high-risk location on the structure and inspects the high-risk location using the robotic vehicle to confirm whether the magnitude of metal loss at the location requires remediation. In further methods, remediation is performed. In still further methods, a three-dimensional visualization of the structure is generated with an overlay which depicts predicted metal loss over the sections of the structure.

10 Claims, 14 Drawing Sheets

(51) Int. Cl.
*G05B 19/406* (2006.01)
*G05B 19/19* (2006.01)
*G05B 19/418* (2006.01)
*G05D 1/02* (2020.01)

(52) U.S. Cl.
CPC .......... B25J 9/1679 (2013.01); G05B 19/19 (2013.01); G05B 19/41895 (2013.01); G05D 1/0227 (2013.01); G06N 3/08 (2013.01); *G05B 2219/45066* (2013.01)

(58) Field of Classification Search
CPC .......... G05B 2219/45233; G05B 2219/45066; G05B 2219/37217; G05B 19/41895; G05D 1/0227; G01N 17/04; G01N 17/00; G01N 17/006; G01N 2021/954; G01N 17/02; G01N 2203/024; G06N 3/08; G06N 20/00; G06F 30/27; G06T 2207/10028; G06T 7/001; G06T 7/0004; G06T 2207/30136; F17D 5/02
See application file for complete search history.

(56) References Cited

U.S. PATENT DOCUMENTS

| | | | |
|---|---|---|---|
| 2015/0148955 A1* | 5/2015 | Chin | B25J 9/162 700/253 |
| 2015/0153312 A1* | 6/2015 | Gonzalez | B25J 5/007 73/23.2 |
| 2017/0169495 A1* | 6/2017 | Rathus | G06Q 30/0625 |
| 2017/0191361 A1* | 7/2017 | Khalaj Amineh | E21B 47/13 |
| 2017/0372196 A1 | 12/2017 | Traidia et al. | |
| 2018/0181136 A1* | 6/2018 | Loosararian | G01B 7/105 |
| 2018/0299392 A1 | 10/2018 | Villete et al. | |
| 2018/0357613 A1* | 12/2018 | Engelbart | G06Q 10/06311 |
| 2020/0175352 A1* | 6/2020 | Cha | G06N 3/0454 |
| 2020/0210826 A1* | 7/2020 | Liu | G01N 27/82 |
| 2020/0302625 A1* | 9/2020 | Helmore | G01B 11/24 |
| 2022/0057367 A1* | 2/2022 | Claudio | G06N 3/126 |
| 2022/0268578 A1* | 8/2022 | Sparago | G01B 21/08 |

FOREIGN PATENT DOCUMENTS

| | | | |
|---|---|---|---|
| GB | 2539661 A | 12/2018 | |
| WO | 2015081135 A1 | 6/2015 | |
| WO | WO-2020162098 A1 * | 8/2020 | G01N 17/00 |
| WO | WO-2021055296 A1 * | 3/2021 | C02F 1/008 |

OTHER PUBLICATIONS

Ramos, Helena G., et al. "An SVM approach with electromagnetic methods to assess metal plate thickness." Measurement 54 (2014): 201-206.

Sharifi, Mona, et al. "Prediction of Remaining Life in Pipes using Machine Learning from Thickness Measurements." SPE Western Regional Meeting. Society of Petroleum Engineers, 2015.

Silakorn, Passaworn, et al. "The Application of ANN Artificial Neural Network to Pipeline TOLC Metal Loss Database." International Petroleum Technology Conference. International Petroleum Technology Conference, 2016.

Vijayaraghavan, G. K., et al. "Estimating Parameters of Delaminations in GRP Pipes Using Thermal NDE and ANN." AIP Conference Proceedings. vol. 1298. No. 1. American Institute of Physics, 2010.

International Search Report and Written Opinion in Corresponding PCT Application No. PCT/US2020/053105 dated Feb. 2, 2021. 13 pages.

* cited by examiner

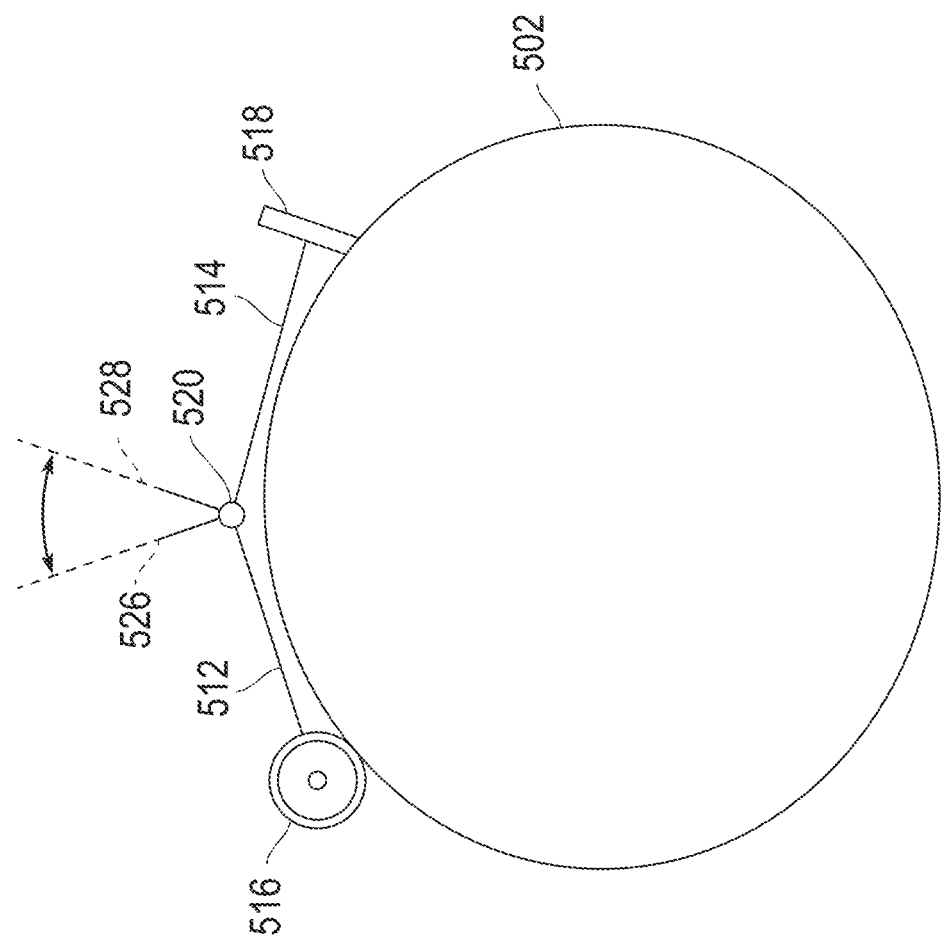

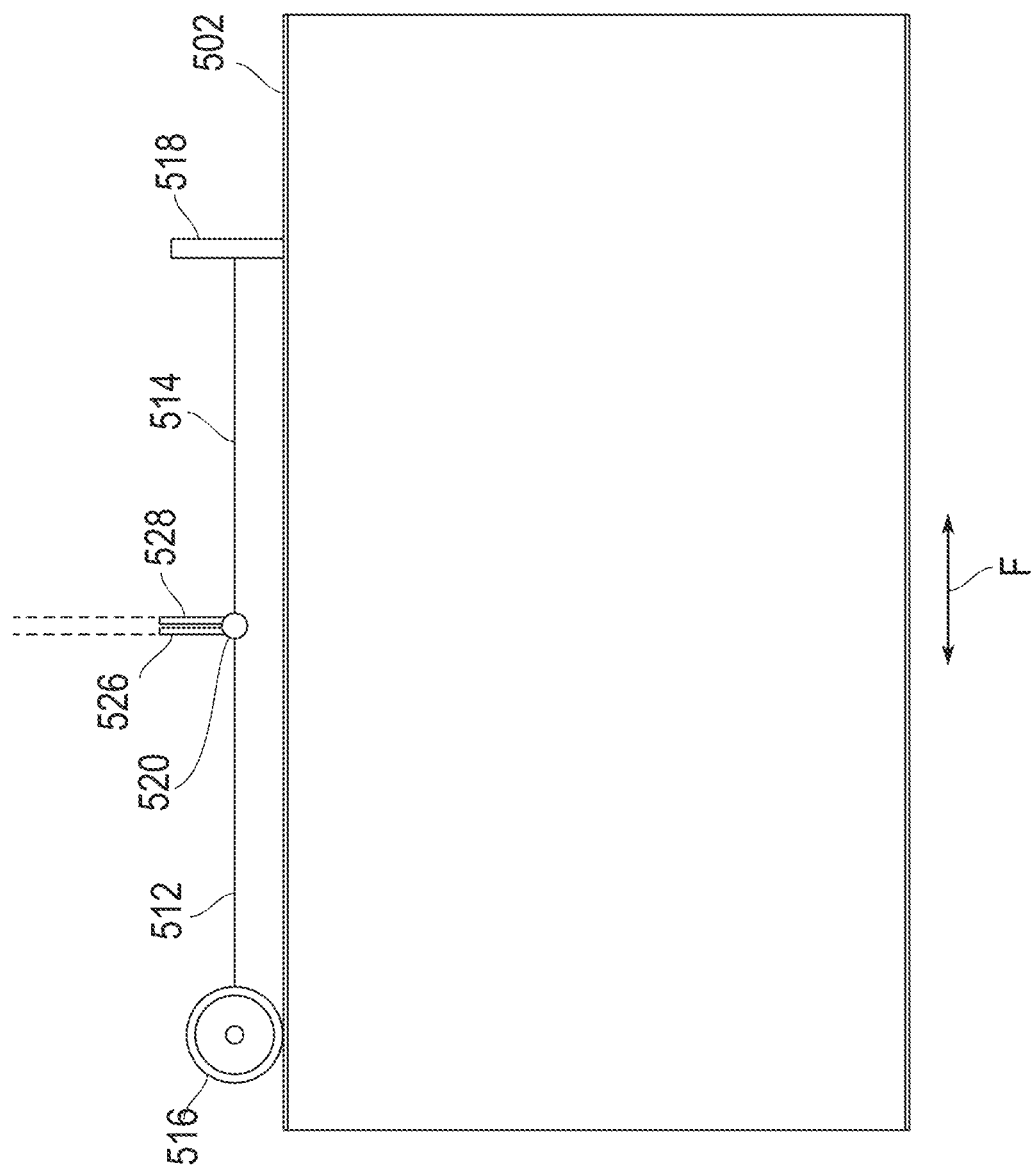

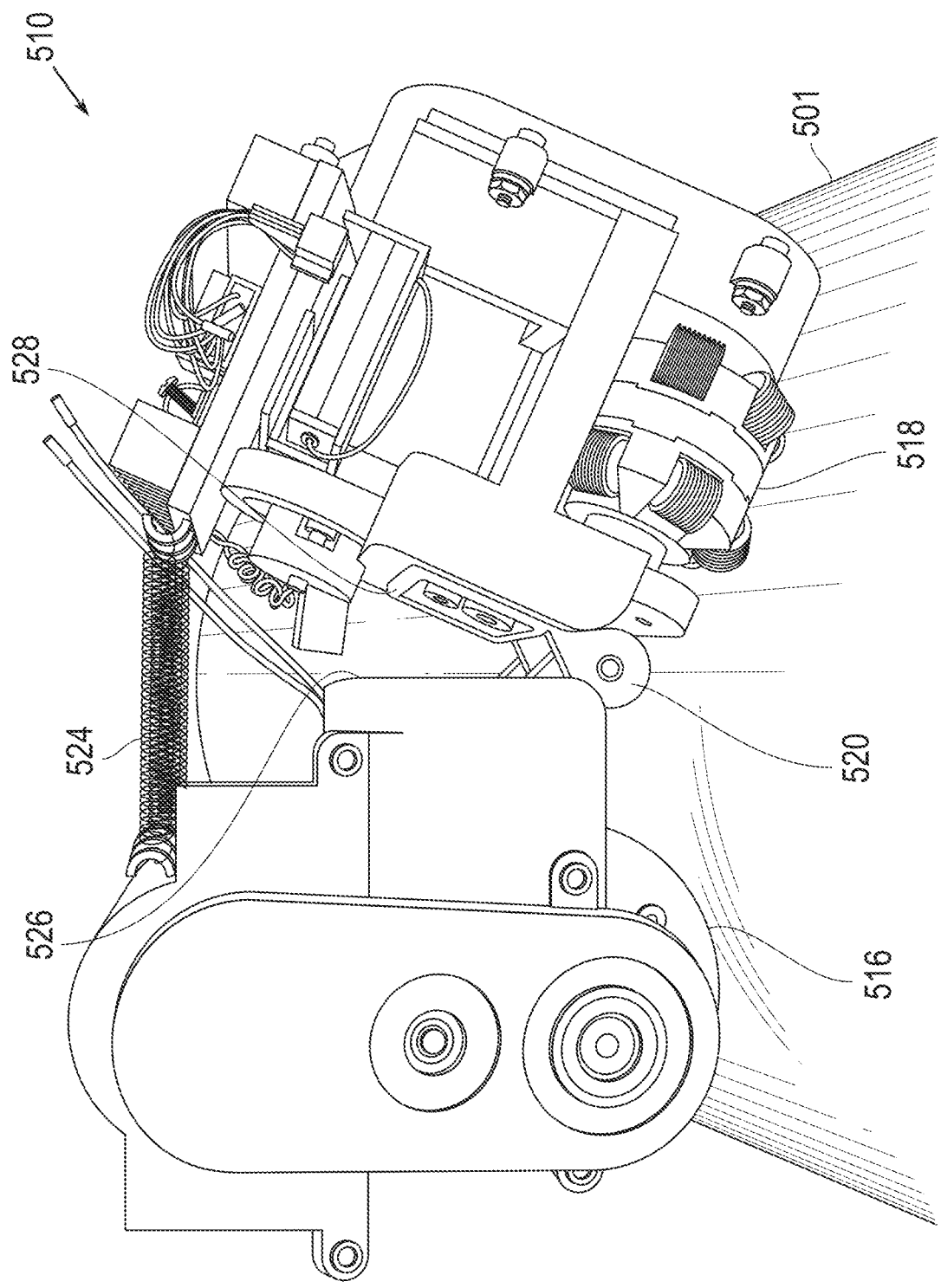

ROBOT DISPATCH AND REMEDIATION OF LOCALIZED METAL LOSS FOLLOWING ESTIMATION ACROSS PIPING STRUCTURES

CROSS-REERENECE TO RELATED APPLICATIONS

The present disclosure relates to commonly-owned and assigned U.S. patent application Ser. No. 14/553,876, now granted as U.S. Pat. No. 9,863,919, entitled "Modular Mobile Inspection Vehicle," which is hereby incorporated by reference in its entirety for any purpose.

FIELD OF THE DISCLOSURE

The present disclosure concerns predictive methods for assessing the condition of structures, and, more particularly, relates to a method of estimating and remediating localized metal loss in pipe structures following estimation of such loss.

BACKGROUND OF THE DISCLOSURE

Infrastructure corrosion is a significant problem faced by the oil and gas industry. Structures such as pipes and tanks are subject to corrosion over time due to the accumulation of moisture and to exposure to the hydrocarbon flows which they carry. Typically, this problem has been addressed by periodic inspections of infrastructure installations by field personnel. This process is time consuming in that it requires the structures to be placed offline, and for coverings and insulation on the structures to be removed to inspect the underlying metallic components. In addition, since infrastructure installations are so large and widespread, only a fraction of the structures can be manually inspected in this manner at any one time. To optimize resources, areas deemed to be of higher risk receive more attention from inspectors. However, the predetermination as to which structures are at highest risk is subject to error.

Recently, automated non-invasive techniques for detecting structural corrosion have been developed. In one such technique, infrared thermal imaging is used to detect corrosion, as described in commonly-owned U.S. patent application Ser. No. 16/117,937, entitled "Cloud-Based Machine Learning System and Data Fusion for the Prediction of Corrosion Under Insulation," the contents of which are hereby incorporated by reference is their entirety. A thermal imaging device can be coupled to a robotic device that can cover large spans of infrastructure, dispensing with the need for manual inspection. Such techniques have provided data about rates of corrosion of different types of structures in a variety of situations.

SUMMARY OF THE DISCLOSURE

The present disclosure provides methods for configuring a processor to predict metal loss in a structure for remediation, and also for remediation of such structures.

In accordance with one method according to the disclosure, a processor is configured to predict metal loss in a structure for remediation. The method uses a machine learning model, trained based upon historical data, to predict metal loss over locations of a structure at a time of the prediction. The method identifies from among the predicted locations a high-risk location on the structure in which a magnitude of metal loss indicates potential remediation being needed, dispatches a robotic vehicle to the high-risk location on the structure and inspects the high-risk location using the robotic vehicle to confirm whether the magnitude of metal loss at the location requires remediation.

Methods in accordance with the disclosure can include the remediation action. The remediation action can at least one of depositing a coating over the structure at the high risk location and increasing a thickness of the structure at the high-risk location by adding metallic material to the structure at the location.

In certain embodiments consistent with the disclosure, the historical data upon which prediction of the amount of metal lost is based can include spatial maps of measured wall thicknesses over time, material composition, operating conditions for structures of the same type and size, or a combination of the foregoing.

In certain embodiments, the robotic vehicle comprises a chassis, a first motion module including a first wheel mounted to the chassis for rotation about a first axis, a second motion module including a second wheel mounted to the chassis, the second wheel being arranged to rotate about a second axis that is at an angle to the first wheel for orthogonal rotation with respect to the rotation direction of the first wheel and an inspection module connected to the chassis configured to collect inspection data related to the vehicle's environment, and a control module connected to the chassis configured to receive the inspection data and wherein the control module is configured to prepare the inspection data for transmission.

In certain implementations, the method uses a navigation module to determine a location of the robotic vehicle relative to the structure as part of the dispatching step.

In certain implementations, the method can further comprise equipping and using at least one of a visual inspection module, an ultrasonic inspection module, and an infrared inspection module in connection with the inspecting step.

In certain implementations, the method can further comprise performing at least one remediation action to improve a condition of the high-risk location using a remediation module of the robotic vehicle, the remediation module including a robot arm and at least one of a cutting tool, a welding tool and a spraying tool.

In accordance with the disclosure and any combination of the foregoing, a method according to the disclosure can further comprise generating a three-dimensional visualization of the structure with an overlay which depicts predicted metal loss over the sections of the structure.

These and other aspects, features, and advantages can be appreciated from the following description of certain embodiments of the invention and the accompanying drawing figures and claims.

BRIEF DESCRIPTION OF THE DRAWINGS

FIG. 6A is a schematic diagram showing the robotic vehicle positioned across a curved surface.

FIG. 6B is a schematic diagram showing the robotic vehicle positioned on a longitudinal edge of a curved surface.

FIG. 7 is another perspective view of a particular robotic vehicle that can be used when implementing one or more methods according to the present disclosure.

DETAILED DESCRIPTION OF CERTAIN EMBODIMENTS OF THE DISCLOSURE

Disclosed herein is a method for predicting metal loss in infrastructural components including pipe structures based on historical data, and from the prediction, identifying one or more high-risk locations on the structure in which a magnitude of metal loss indicates potential remediation being needed, dispatching a robotic vehicle to each such high-risk location and using it to inspect in order to confirm whether the magnitude of metal loss at the location requires remediation. In certain embodiments of the method, a plurality of machine learning models for different structural categories are trained using historical data. The machine learning models can be validated by field inspection and/or non-invasive field monitoring techniques. Quantification of any errors in the machine learning model ascertained during the validation phase can be used as factors in correcting and adding robustness to the machine learning model.

In part, data can be gathered, for instance, as described in the aforementioned U.S. patent application Ser. No. 16/117,937 to develop an accurate model of corrosion from which an accurate prediction as to how much corrosion has accumulated, or, equally, how much metal has been lost, in a particular structure over time. The ability to provide such an accurate prediction enables visualization, when desired, of locations at which facilities and equipment are at a highest risk as compared to locations in which there is no corrosion or less corrosion accumulation and can further enable rapid and efficient replacement of damaged equipment. As such, the present disclosure provides a predictive model of metal loss in pipe structures which enables such identification of structures at risk of corrosion failure and targeted remediation at the identified, high-risk locations to maintain the quality of oil and gas infrastructure.

Metal Loss Estimation

In part, the present disclosure concerns metal loss estimation of a structure such as a pipeline. In this aspect, embodiments of the invention can be implemented in a number of ways, such as described next.

Figure 1:
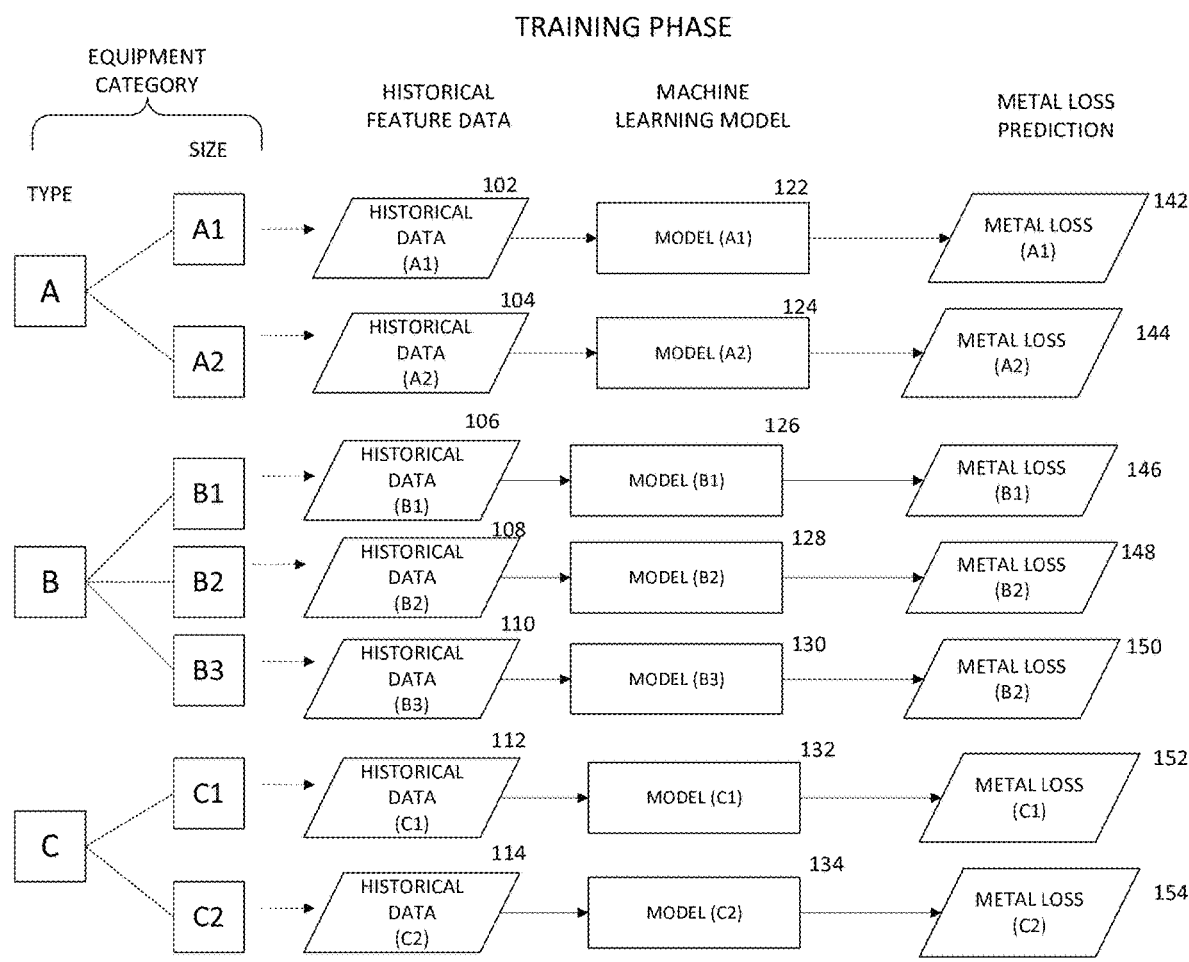
FIG. 1 is a schematic flow diagram of a system and method for training a model to determine metal loss from historical data according an embodiment of the present disclosure.

FIG. 1 is a schematic flow diagram of a system and method for training a model to determine metal loss from historical data according an embodiment of the present disclosure. In the system, components of piping infrastructure are categorized by type and size. In the example shown in FIG. 1, three distinct component types A, B and C are shown for ease of illustration. Component types A, B and C can be any one of, without limitation, pipe tubing, elbows, fittings, flanges, welded joints, and gaskets, among other component types. Each component type can have one or more standard or custom sizes. In the example shown in FIG. 1, component type A has two different sizes, A1 and A2; component type B has three sizes B1, B2 and B3; and component C has two sizes C1 and C2.

For each of the component type-size combinations, detailed historical data regarding the condition of components of the pertinent type/size installed in the field are acquired and compiled. As depicted, blocks representing historical data (A1) 102, historical data (A2) 104, historical data (B1) 106, historical data (B2) 108, historical data (B3) 110, historical data (C1) 112, and historical data (C2) 114 are shown. The historical data for each of the type-size combinations includes The dates of installation, spatial maps of wall thickness measurements over time, the types of material from which the components (structures) are made (such as the type of steel), the types of coating(s) used on the components, operating conditions of the material which the pipes transport including temperature, pressure and flow rate (among others), the products transported through the components (such as gas, refined hydrocarbons and water), ambient conditions over time including temperature and humidity at the location at which the structures are installed, the location of the components (above ground or underground), and the time/date at which the data regarding the components were collected.

For historical data for each type/size combination is fed into a training model specific to the combination. More specifically, historical data (A1) 102 is input to training model (A1) 122, historical data (A2) 104 is input to training model (A2) 124, historical data (B1) is input to training model (B1) 126, historical data (B2) is input to training model (B2) 128, historical data (B3) 110 is input to training model (B3) 130, historical data (C1) is input to training model (C1) 132, and historical data (C2) is input to training model (C2) 134. Training models 122-134 are designed to determine, at a certain time of prediction, the amount of metal loss a particular component has sustained, based on knowledge of how similar components have behaved (and suffered from metal loss) over time. Training models 122-134 can be any one of a wide range of machine learning algorithms that are used to determine a quantity (as opposed to determining a classification) such as but not limited to linear regression, generalized linear models (GLM), support vector regression (SVR), gaussian process regression (GPR), decision trees, a Boltzmann machine, a Gabor filter, and neural networks including an artificial neural network (ANN), a deep neural network (DNN), a recurrent neural network (RNN), a stacked RNN, a convolutional neural network (CNN), a deep CNN (DCNN), and a deep belief neural network (DBN), and other supervised learning technologies. The training models 122-134 can utilize the same type of algorithm, or different algorithms can be used for different type/size combinations.

The training models use all of the time series historical data, including numerous different features and parameters to estimate a rate at which metal is eroded or otherwise lost from the different pipe components. From the estimated metal loss rate, a prediction of metal loss at a given future time of prediction can be extrapolated. For instance, if upon execution of the training model 128 it is determined that that component B2 suffers metal loss at the rate of 2 cubic millimeters per month and the metal loss of a specific component is 14 cubic millimeters as of the end of 2017, then if the time of prediction is the end of 2019, the model extrapolates a loss of approximately 14+2*24 (months)=62 cubic millimeters, adjusted for various factors including changes to the metal loss rate based on ambient, operational and other factors. Returning to FIG. 1, the output of each of the training models 122-134 is an associated metal loss prediction. More specifically, the output of training model (A1) 122 is metal loss prediction (A1) 142, the output of training model (A2)124 is metal loss prediction (A2) 144, the output of training model (B1) 126 is metal loss prediction (B1) 146, the output of training model (B2) 128 is metal loss prediction (B2) 148, the output of training model (B3) 130 is metal loss prediction (B3) 150, the output of training model (C1) 132 is metal loss prediction (C1) 152 and the output of training model (C2) is metal loss prediction (C2) 152.

Figure 2:
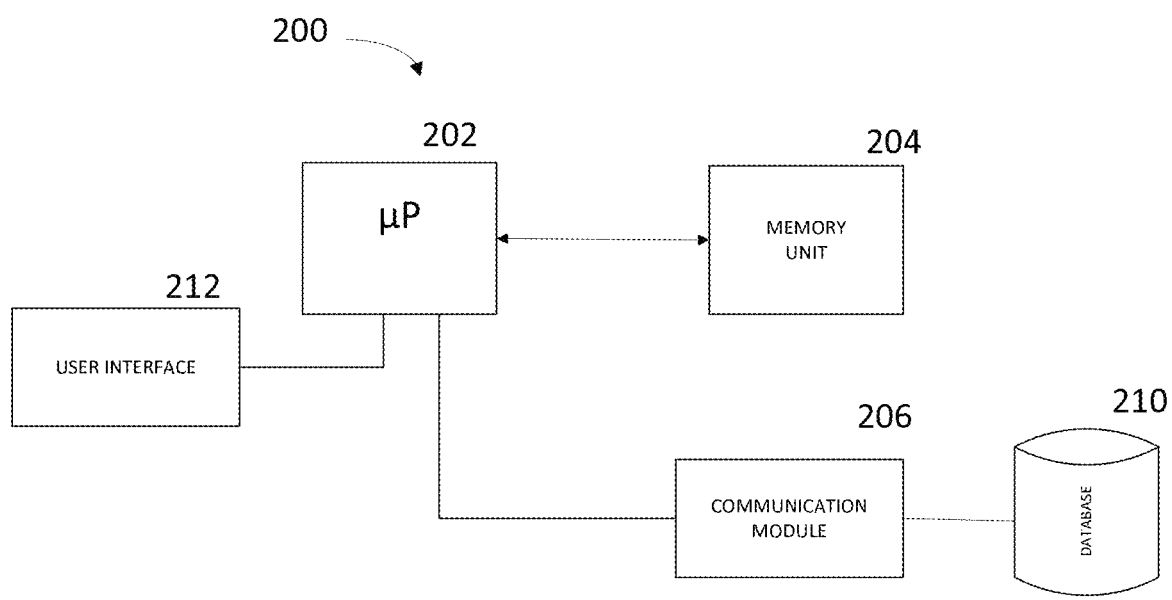
FIG. 2 is a schematic block diagram of a computing device that can be configured to perform the training and testing procedures for determining metal loss according to the present disclosure.

FIG. 2 is a schematic block diagram of a computing device that can execute a method for training a model to determine metal loss from historical data according an embodiment of the present disclosure. The computer device 200 includes a processor 202, a memory unit 204 coupled to the processor, and a communication module 206 which can include a transceiver and associated components for sending and receiving signals (over a wired or wireless medium) from and into the computing device. The communication module 206 is also coupled to the processor 202. Memory unit 204 can include local cache memory, random-access memory (RAM), read-only memory, or other types of memory that can be readily accessed by the processor 202. Contents of the memory unit 204 can include programmed instructions that enable the processor to execute the training method described above. In other implementations, the programmed instructions can be received remotely via the communication module 206. The historical data which the training method uses can be stored remotely on one more accessible databases collectively represented by database 210, which the processor can access via communication module 206. The computing device 200 also includes a user interface 212 through which users can enter data and view displayed data.

After the models 122-134 (shown in FIG. 1) have been trained using the available historical data, the models are tested using field data. Field technical personal invasively or non-invasively inspect samples of pipe components in the field and determine the actual metal loss incurred by the samples. This information can be input to a computing system to compare the actual metal loss with metal loss predictions generated by the models with respect to the same component type/size as those sampled.

Figure 3:
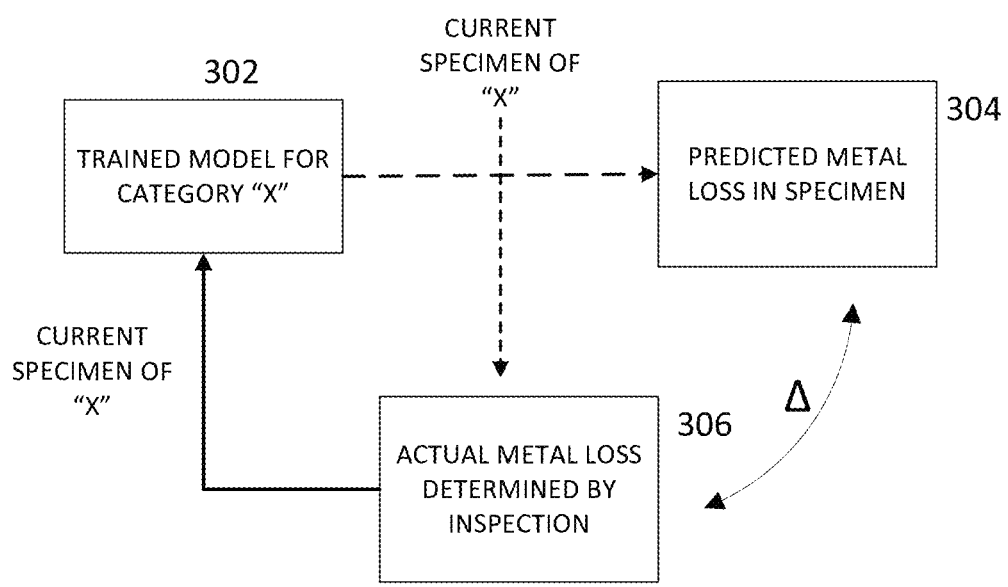
FIG. 3 is schematic diagram of a process for testing a model for determining metal loss according to an embodiment of the present disclosure.

FIG. 3 is a schematic diagram showing a model testing process according to the present disclosure. In FIG. 3, a model 302 generates a metal loss prediction 304 for a specific component type/size having a representative example in the field. Field engineers determine the actual metal loss 306 of the representative example. Typically, there is some difference (A) between the actual and predicted metal loss. Importantly, the magnitude of A is input back to the model 302 to help retrain the model with the aim of reducing the magnitude of A; that is, the model algorithm recomputes the weights of various of the factors so as to bring the metal loss prediction closer to the actual metal loss value obtained in the field. This process is repeated over numerous samples for as many component type/size combinations as possible to obtain a sufficiently large testing data set. In operation, users input the actual metal loss values into the computer device which is configured to execute the model algorithms in a supervised manner. The weightings of the models are adjusted by a backward propagation process based on the known metal loss values to improve the accuracy of the models.

Once a model of any type-size combination has been trained and tested, the computing device that executes the model can also be configured to display a dashboard the hosts a three-dimensional simulation of facilities, plants and their related assets. The three-dimensional simulation displays the assets such as pipe structures (with zoom-in, zoom-out capability). On or adjacent to each structure in the simulation, an overlay can be displayed which indicates the predicted metal loss of the structure as a function of time.

Optionally, the simulation can include functionality allowing an operator to select a plant or facility, and once a plant is selected to generate a three-dimensional simulation of the selected facility, if desired. Each component in the facility (i.e. assets, pipelines, etc.) can be selected by the operator. Upon selection, the computing device is configured to generate and display a heat map with the predicted thickness for all x, y, and z coordinates of the selected component. These predictions are generated in real time using the trained and tested model.

Using such simulations, the operator can generate heat maps of any section or an entire facility to identify the areas with that require immediate remediation, for instance, because the heat map indicates a high likelihood of failure due to metal loss (such as greater than 20% chance of failure over the next year being a "high" likelihood). The simulations enable operators to target areas of higher risk of failure efficiently instead of by random spot checks of locations during periodic inspections.

In particular implementations of the disclosure, areas of higher risk are identified by the prediction using the trained machine learning model and are used without any visualization on a screen or otherwise to a user in order to dispatch robotic vehicles in order to inspect and possibly take remediation action as a function of whether the magnitude of metal loss at the identified location or locations requires remediation.

Figure 4:
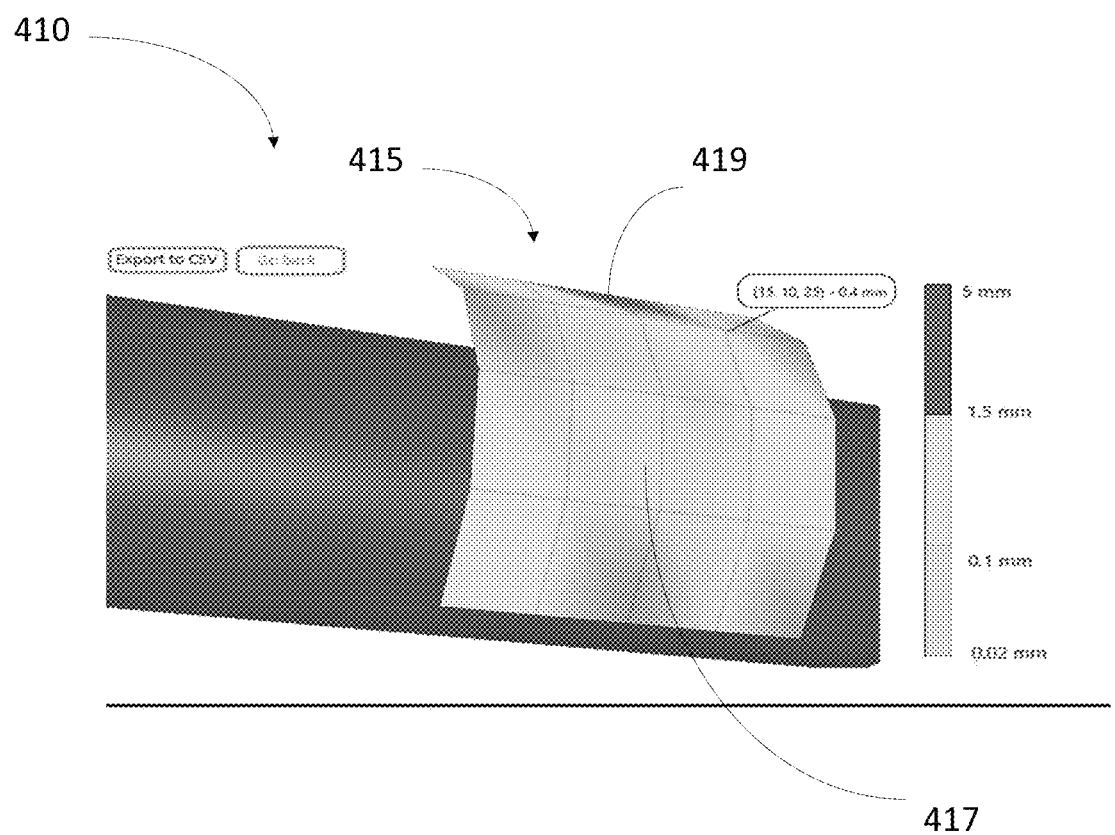
FIG. 4 is a perspective view of an example visualization of a pipe component with an overly depicting metal loss according to an embodiment of the present disclosure.

FIG. 4 is an example illustration of a heat map which is optionally generated for a pipe component according to the present disclosure. The heat map can be generated on a computing device configured with software for rendering three-dimensional images using the data obtained from executing one or more of the machine learning models described above. In FIG. 4, a component 410 is illustrated with an overlay 415 which is configured to appear when the operator hovers over a section of the component using an interface device (such as a mouse or touch screen, as known in the art). The overlay shows expected levels of metal loss at the coordinates of the component section. The area of component encompassed in the overlay is a parameter that can be set by the operator. As shown in the figure with reference to the legend to the right, the overlay displays variations in the amount of expected metal loss at different coordinates within the covered section. For example, the middle of the overlay 415 shows an area with low expected metal loss 417 (about 0.02 mm to about 0.1 mm of expected metal loss), while the top of the overlay displays an area with a considerably higher expected metal loss 419 (about 1.5 mm to about 5 mm of expected metal loss).

As will be understood, in certain implementations of the disclosure, areas of higher risk that have been predicted as described above using the trained machine learning model, can lack visualization on a screen or otherwise to a user. Instead robotic vehicles can be dispatched in order to inspect and possibly take remediation action as a function of whether the magnitude of metal loss at the identified location or locations requires remediation, and information can be exchanged between the robotic vehicle and a machine used by an engineer to log the actions taken or to be approved to be taken by the robotic vehicle. Nevertheless, the method of determining and visualizing metal loss in pipe structures is considerably more accurate than conventional approaches because the algorithmic models take into account various parameters such as geometrical shape of the structure and operating conditions to provide a better estimation of the remaining wall thickness.

Remediation

One of the benefits of the metal loss estimation method, as can be practiced in accordance with the disclosure above, is that it provides field technical personnel with a guide as to which elements of infrastructure are at highest risk and for which remediation efforts, such as fixing or replacing the elements concerned, are indicated.

Figure 5A:
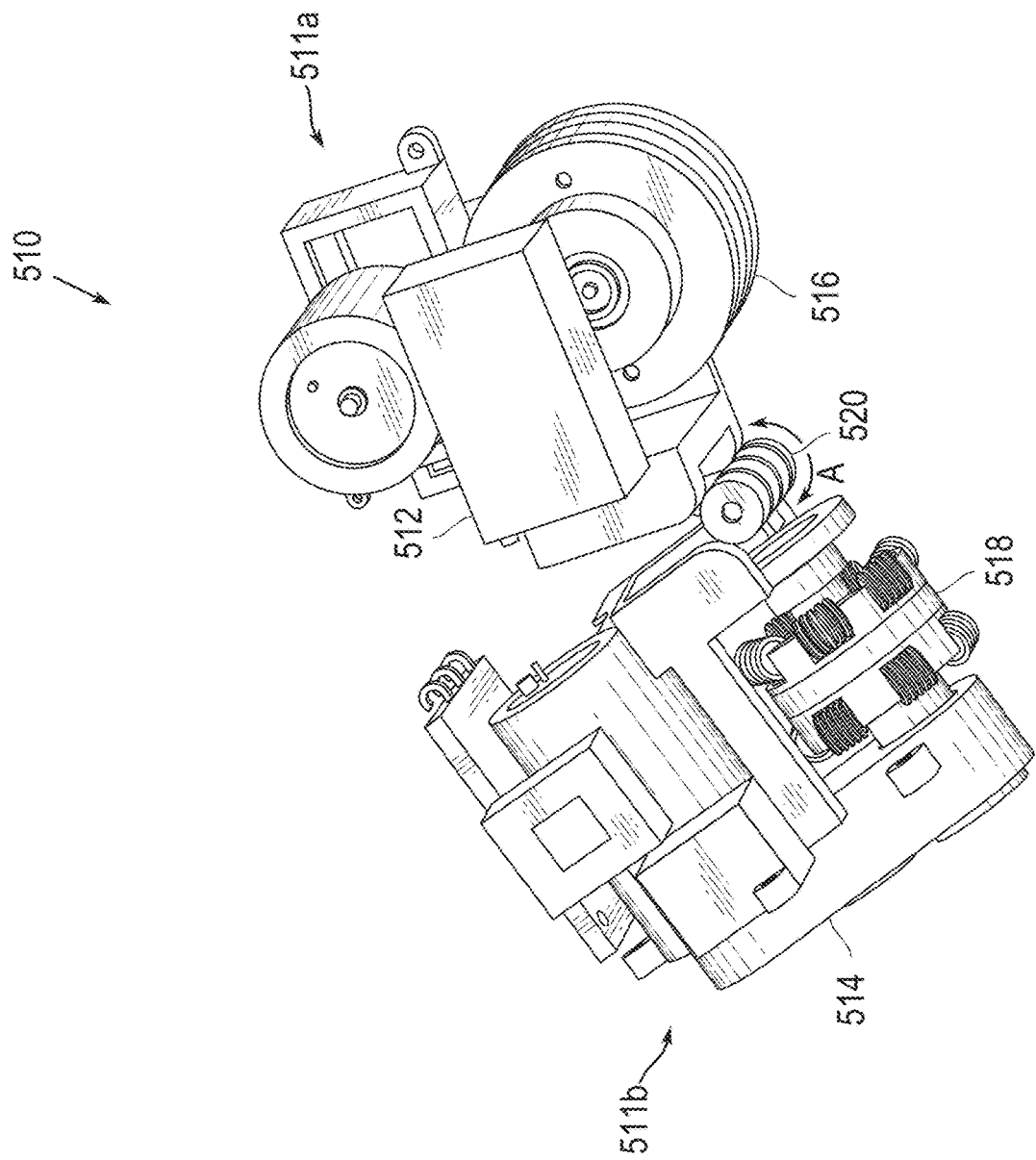
FIG. 5A is a first perspective view of one type of robotic vehicle that can be used in inspection procedures according to the present disclosure.

Because infrastructure elements can be located in positions of facilities that are difficult to access by personnel, remotely controlled robotic devices can usefully applied in connection with monitoring and remediation procedures. FIGS. 5A and 7 show an embodiment of a robotic vehicle 510 that can be used in remediation operations according to the present disclosure, though vehicles of other construction can be used if configured to enable the inspection and remediation described herein. Note that the robotic vehicle is also described in U.S. Pat. No. 9,863,919, which is hereby incorporated by reference in its entirety.

As disclosed in the '919 patent, the vehicle 510 comprises two modules, a driving module 511a and a steering module 511b. The driving module 511a includes a first chassis section 512 and a magnetic drive wheel 516 that is adapted to drive the vehicle 510 in forward and backward directions. The steering module 511b includes a second chassis section 514 and an orthogonally mounted magnetic omni-wheel 518. The omni-wheel 518 provides active steering and passive sliding (through small rollers) during driving. In other embodiments, a common chassis can be provided to which the steering module and drive module are mounted. The robotic vehicle 510 is particularly adapted for sliding longitudinally or rotating about pipes, elbows and joints that have curved surfaces.

Figure 11B:
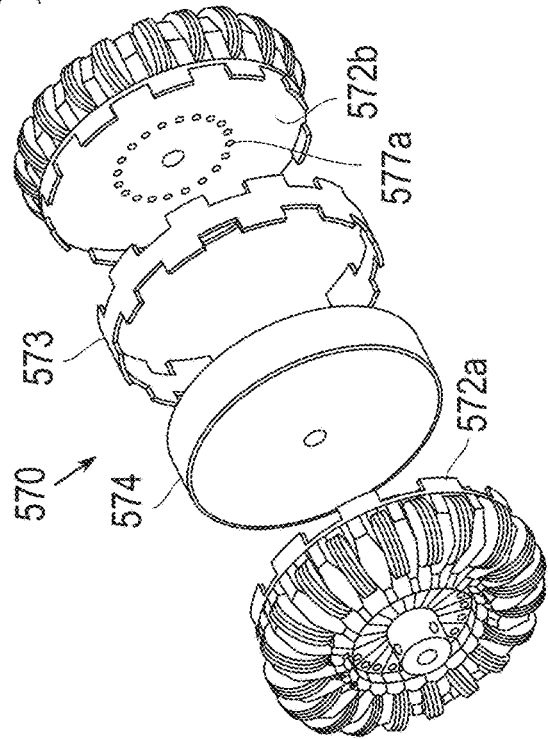
FIG. 11A-D show perspective views of an omni-wheel that can be used in an embodiment of the robotic vehicle in connection with one or more methods according to the present disclosure.
Figure 11A:
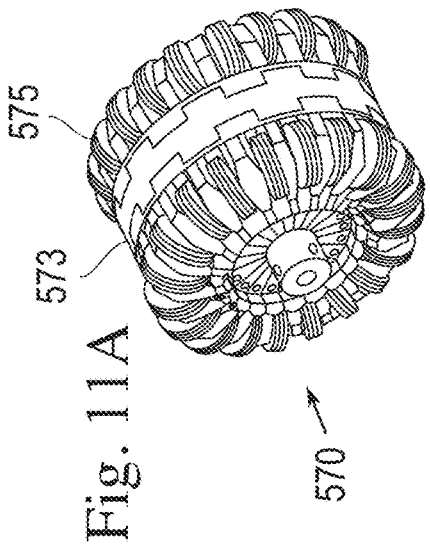
Figure 11D:
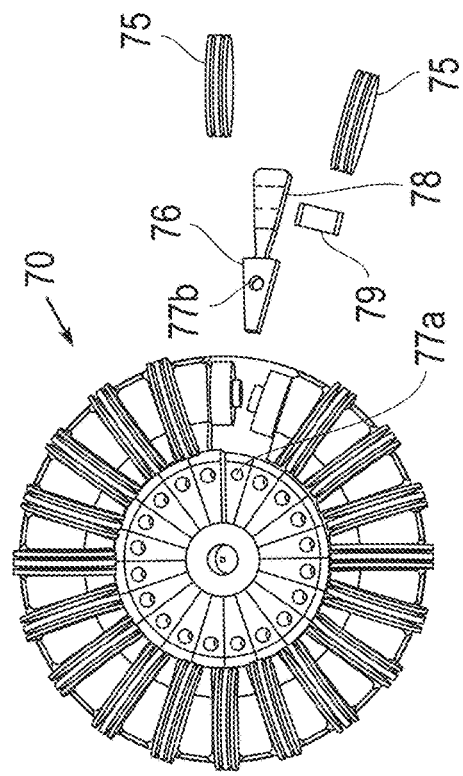
Figure 11C:
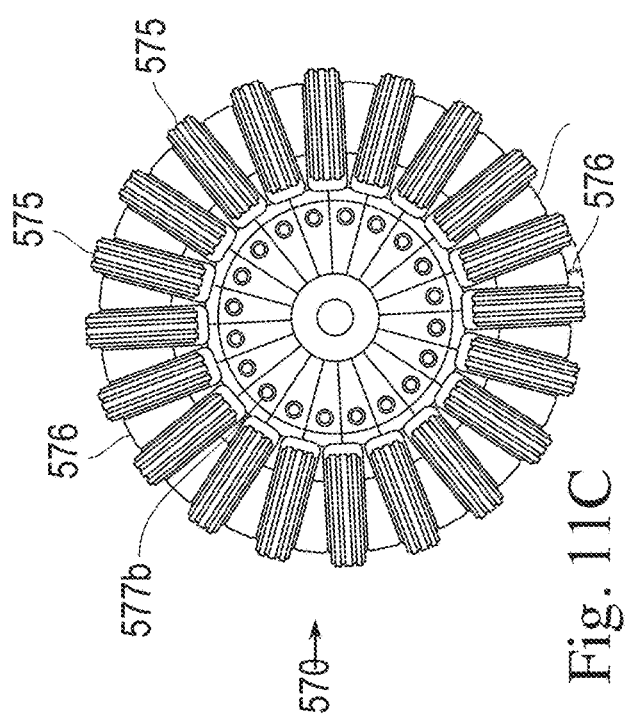

The chassis sections 512, 514, drive wheel 516, and omni-wheel 518 can include magnets that provide an attractive force between the vehicle and a ferromagnetic/magnetically inducible material such as steels that are commonly used in pipes. The magnets can be selected such that they provide sufficient attractive force to permit the vehicle to travel in vertical and/or inverted positions when traveling along ferromagnetic/magnetically inducible surfaces. The magnets can also provide sufficient attractive force to permit the vehicle to remain in place on a surface section during inspection and remediation procedures. The magnets can be selected to be resistant to extreme temperatures and can also provide a thermal insulating buffer to help isolate the vehicle itself from extreme temperature conditions. One embodiment of the omni-wheel 518 is shown in FIGS. 11A-11D However, other structural arrangements can be used. As shown in FIG. 11A, the omni-wheel 570 can comprise two hubs 572a, 572b with a spacer ring 573 disposed between the two hubs. The spacer ring 573 defines a cavity in which a magnet 574 can be positioned.

A plurality of rollers 575 are coupled to the circumference of the two hubs 572, 572b via respective mounting wedges 576. The mounting wedges including mounting holes 577b. The rollers 575 of one hub e.g., 572a, can be aligned or indexed in a staggered manner with respect to the rollers 575 of the second hub 572b. The staggering of the rollers 575 reduces the bumpiness in each wheel and provides for a smoother travel of the vehicle. The spacer 573 can be made from a non-ferrous material that does not transfer the magnetic force of the magnet which it bears thus preventing magnetic coupling between the hubs 572a, 572b. The hubs 572a, 572b further include a plurality of mounting holes 577a that correspond to the mounting holes 577b on each mounting wedge 576 so that the wedges can be connected to the hub (for example, via a fastener such as a screw, bolt, rivet, pin, etc.). Each mounting wedge 576 includes an axle mounting surface 578 that is sized and shaped to receive wheel axle 579. As can be seen, rollers 575 are mounted on axle 579 which is supported in the axle mounting surface 578 of wedge 576. The wedge 576 is attached to the hub 72 via mounting holes 577a and 577b. In this arrangement, the rollers can be readily assembled and disassembled from the hubs. As discussed above, the hubs 572 and the wedges 576 can be made of ferrous material that acts as a magnetic flux concentrator. The magnet 574 can be orientated such that its poles are directed toward the hubs and wedges which concentrate and direct the flux of the magnet toward the traveling surface. The size and shape of the wedges can be varied such that the distance (D) between edge of the wedge and the traveling surface is reduced, which results in an increase of the magnetic attractive force between the wheel and the surface. The hub, wedges, and the rollers are sized and shaped so that the material of the hubs and wedges are in near contact with the surface as the wheel travels.

The outer edge of the wedges 576 can have a concave profile that matches the circumferential profile of the hubs 572a, 572b. In this way, the wedges 576 can be brought closer to the traveling surface. The concave profile of the wedges also helps to maintain a consistency in the attractive force over a flat-edged wedge by ensuring that the distance of between the traveling surface and the wedge remains constant as the wheel rotates. The magnetic attractive force between the wheel and the traveling surface can be greatly increased in this manner without changing the size of the magnet. Such a construction of a magnetic omni-wheel is particularly useful for use in the hinged robotic vehicle 510. The omni-wheel structure is capable of efficiently directing the force of the magnet to maximize the magnetic force that holds the vehicle in magnetic purchase with the ferromagnetic traveling surface, especially in vertical and inverted conditions. Thus, smaller magnets can be used, thereby reducing the vehicle size and weight, which in turn increases the mobility and decreases the power consumption of the vehicle.

The first and second chassis sections 512, 514 of the robotic vehicle 510 are connected via a hinge 520. The hinge 520 can be implemented as a knuckle/pin hinge, ball and detent hinge, for example. Alternatively, other types of structures can be used to provide a degree of freedom between the two chassis sections. For example, a flexible material (e.g., flexible plastic) can be used to connect the two chassis sections together while providing the degree of freedom between the two chassis sections. The hinge 520 provides a degree of freedom of movement between the first and second chassis sections so that they can rotate with respect to each other as indicated by arrow "A". This freedom of movement provides the flexibility of movement for the vehicle to traverse curved surfaces while the drive wheel 16 and omni-wheel 18 remain in contact with and oriented normally to the curved surface 501 (e.g., steel pipe). This degree of freedom can permit movement in both the up and down directions, which can increase the vehicle's ability to traverse both convex surfaces (e.g., outside of a pipe) and concave surfaces (such as the inside surface of a storage tank). The width of the omni-wheel and the magnets that provide attractive force between the wheel and the surface help resist unwanted movement in the up and down directions. The omni-wheel, by its width and its magnets, is biased to be normal to the traveling surface. Accordingly, the omni-wheel itself provides a resistive force to over rotation of the vehicle about the hinge. In addition, the hinge can have other limited degrees of freedom which can be accomplished by incorporating some play in the hinge design. This play can improve the function of the robot as it moves along particular trajectories that induce a twisting motion between the two chassis sections, such as when the vehicle is traveling in a helical pattern around a pipe.

Figure 5B:
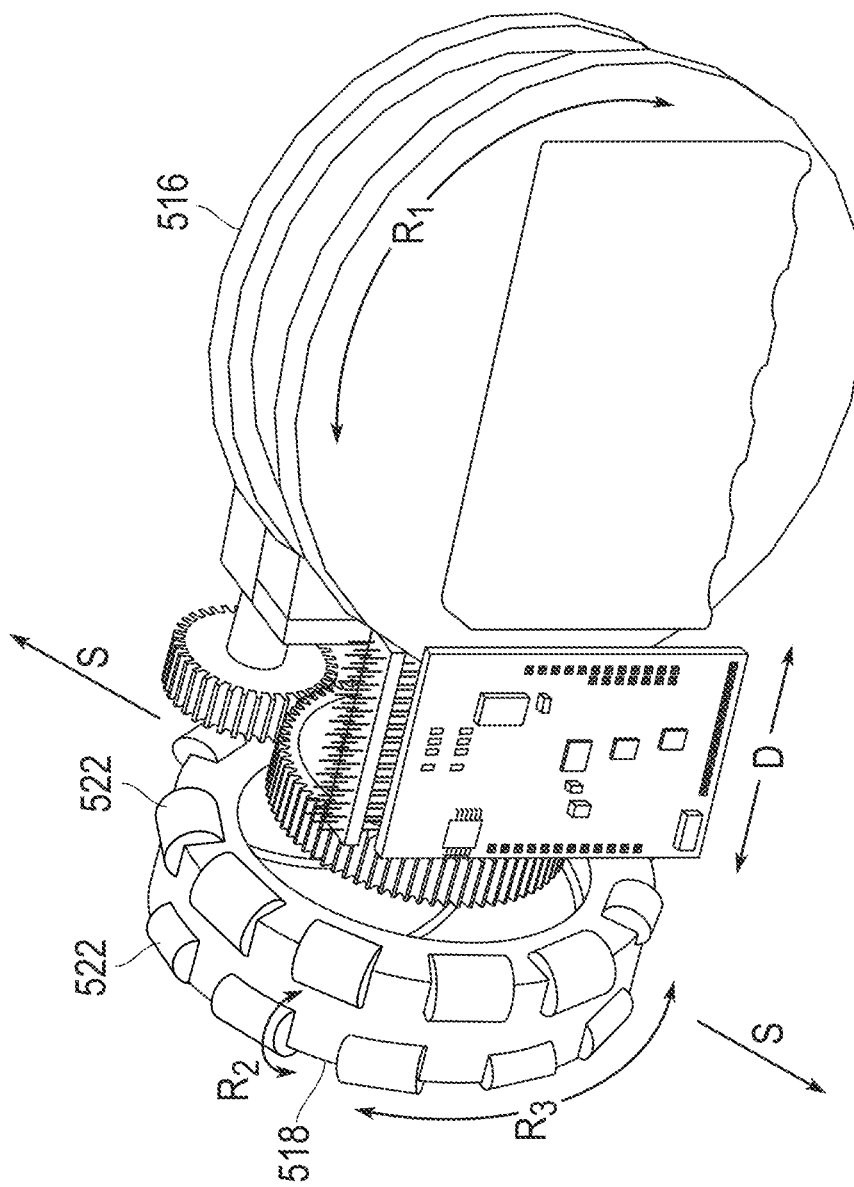
FIG. 5B is a second perspective view of the robotic vehicle shown in FIG. 5A.

FIG. 5B depicts the robotic vehicle 510 in a different orientation without illustrating the hinged chassis. In an embodiment of a robotic vehicle that has a preferred direction of travel that is indicated by arrow "D," the drive wheel 516 of the robotic vehicle 510 rotates about its access in a direction indicated by arrow "R1" in response to a motor that propels the vehicle forward. The axis of rotation of the omni-wheel 518 is nominally oriented perpendicular to the drive wheel 516 (and the wheels are in orthogonal planes), as shown in FIG. 5B. The omni-wheel 518 includes a plurality of rollers 522 that are located around the periphery of the omni-wheel 518. The rollers 522 are mounted on the omni-wheel 518 (via pins or axles, for example) for rotation in the same direction as the drive wheel 516, as indicated by arrow "R2" (i.e., R1 is the same direction as R2). Accordingly, when the drive wheel 516 is driven, the omni-wheel 518 can serve as a follower wheel that is not driven. The rollers 522 passively rotate as the drive wheel 516 is driven, thereby allowing the vehicle to travel in the driven direction as indicated by arrow "D" with the rollers serving the purpose of reducing the friction of the passive omni-wheel 518.

It is to be understood that any structural and functional details disclosed herein are not to be interpreted as limiting the systems and methods, but rather are provided as a representative embodiment and/or arrangement for teaching one skilled in the art one or more ways to implement the methods.

The robotic vehicle 510 can be steered by driving the omni-wheel 518 using a motor by using conventional linkages between the omni-wheel and the motor. The omni-wheel 518 rotates in a direction indicated by arrow "R3". Rotation of the omni-wheel causes the vehicle to turn or steer in a direction indicated by arrows "S". The hinge 520 is constructed to have minimal to no yield as the omni-wheel is driven in the "S" directions so that the vehicle can be rotated in the direction "S" without the vehicle folding upon itself. Therefore, movement in the "S" direction of the omni-wheel 518 can be correlated with a re-orientation of the drive wheel 516 as a result of the movement transferred to the drive wheel through the hinge 520. The wheels 516, 518 can be activated and driven separately or at the same time to effect different types of steering of the vehicle 510.

The configuration of the wheels of the robotic vehicle provide for excellent mobility and stability while maintaining a relatively small footprint. This permits the robotic vehicle to fit with maneuverability into small areas that would be difficult, if not impossible, to achieve with traditional arrangements such as four wheeled vehicles. For example, a robotic vehicle having the described arrangement can be constructed so that it can be effective on surfaces ranging from 8 inches in diameter to completely flat surfaces. In addition, the drive wheel can have a relatively wide and flat configuration, which further provides stability to the vehicle.

Referring to the perspective view of FIG. 7, the vehicle 510 is shown traversing a curved ferromagnetic surface 501, which, by way of example, can be a steel pipe. The drive wheel 516 and the omni-wheel 518 include magnets and each chassis section is thereby attracted via the magnets in the wheels to the ferromagnetic/magnetically inducible material surface (e.g., a material that generates an attractive force in the presence of a magnetic field, such as a steel pipe). Alternatively, or in addition, the chassis sections 512, 514 themselves can include magnets that provide attractive force between the chassis sections and the ferromagnetic surface. As such, when the robotic vehicle traverses a curved or uneven surface, each of the chassis sections 512, 514 can be magnetically attracted to the surface and the hinge 520 enables the chassis sections to rotate relative to one another. By this arrangement, the drive wheel 516 and the omni-wheel 518 maintain contact with and normal to the surface along which the vehicle 510 is traveling. A spring 524 coupling the two chassis sections 512, 514 can be used to assist the sections back to a neutral position in which the two wheels are located on the same planar surface with approximately zero degrees of rotation between the two chassis sections.

FIGS. 6A and 6B are schematic diagrams showing a robotic vehicle positioned across a curved surface and positioned on a longitudinal edge of the surface, such as a pipe, respectively. As shown in FIG. 6A, the chassis sections 512, 514 rotate about the hinge 520 so that the wheels maintain contact with the curved surface 502 on which the vehicle is traveling. This is advantageous as failure of one or two of the wheels to maintain contact with the traveling surface can have negative consequences and possibly resulting in detachment of the robotic vehicle from the structural surface. As shown in FIG. 6B, the robotic vehicle 510 is disposed on the longitudinal edge of pipe 502. The hinge 520 can include rotation stops 526 and 528 such as mating surfaces on each of the first and second chassis sections. The rotation stops 526, 528 can be positioned to prevent undesired rotation about the hinge 520, or to limit rotation to a set range of degrees, such as when the vehicle is on a flat surface or the two wheels are otherwise on the same plane. Accordingly, the robotic vehicle can rotate about the hinge to adapt to both concave and convex surfaces on the inside or outside of a structure such as a pipe or tank. The width of the omni-wheel and the magnets that provide attractive force between the wheel and the surface help resist unwanted movement in the up and down directions. The omni-wheel, by its width and its magnets, is biased to be normal to the traveling surface. Accordingly, the omni-wheel itself provides a resistive force against over-rotation of the vehicle about the hinge.

Having a self-adjusting system allows the robotic vehicle to roam freely on a pipe in any direction since the transition from longitudinal to circumferential driving involves changes in the observed curvature of the robotic vehicle. The robotic vehicle can move forward and backward by driving the magnetic drive wheel while the rollers of the omni-wheel allow smooth unrestrained sliding of the omni-wheel. The robotic vehicle can perform a full 360 degree in-place rotation on the pipe surface by operating the steering omni-wheel while pivoting around the driving wheel. Turning right and left while driving is possible by actuating both wheels. A combination of all these driving modes allows the vehicle to perform various intricate maneuvers to avoid obstacles (e.g. joints) and follow helical paths to achieve full pipe coverage during inspection. The in-line placement of the two wheels allows the vehicle to navigate on narrow surfaces such as narrow beams and columns and small diameter pipes.

The geometric parameters of the vehicle, which can include the diameter of the wheels and the distance between the wheels and the hinge, are factors that can be measured and known and that remain constant during an inspection performed by the robot. In addition, the diameter of the surface on which the vehicle is deployed for inspection 502 can be measured and known and that remains constant during an inspection performed by the robot. The hinge angle can be measured via a sensor (e.g., using a potentiometer, encoder, strain gauge, the relative difference between 2 Inertial Measurement Units, one mounted on the driving module and another on the steering module over a short period of time, or other suitable sensors, etc.). Using the known and constant factors associated with the vehicle and the surface, combined with the measured angle about the hinge, the relative orientation of the robotic vehicle 510 with respect to the surface 502 can be calculated. This is particularly useful for navigation of the vehicle and can be used as supplement in combination with other navigation systems, such as inertial sensor and/or encoders. Thus, the measurement of the hinge angle can also be used to correct drift that may occur in other, inferential navigation sensors.

In certain embodiments in which communication challenges are expected, there is a large demand for power, or a need for an external supply of fluid, for example, the robotic vehicle can include a tether. A tether can provide for transmission of communication signals, electrical power, and other elements than can be required by the vehicle, such as additional input data and couplant fluid, for example, in certain applications that demand a tether. For example, the robotic vehicle can include a connection module. The connection module is configured with a suitable connector so that the tether can be connected to the vehicle. Accordingly, as the robotic vehicle moves about during an inspection, the tether remains securely connected to the vehicle and moves with it. The tether can be single purpose (e.g., power) or can serve multiple purposes and include multiple components (e.g., power wires, communication wires/fibers, fluid lines, etc.). Accordingly, with the tether connected to the vehicle the other modules can be connected, either directly or indirectly, to the appropriate components of the tether. Meanwhile, in other embodiments power can be self-contained on-board the robotic vehicle or be configured for recharge by another robotic entity (e.g., a charging station or an unmanned aerial vehicle) and communications can be wireless.

Figure 9:
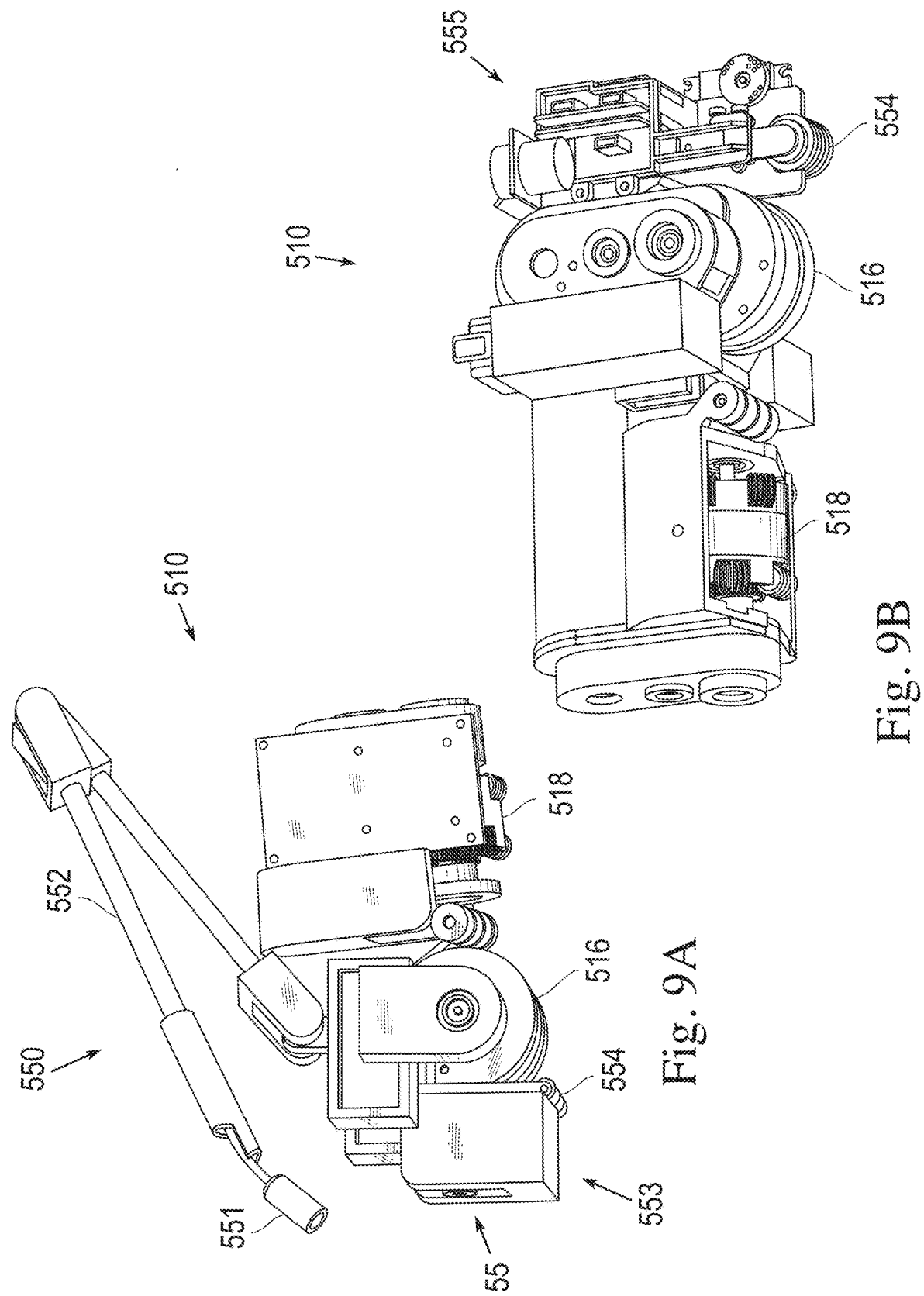
FIG. 9A is a perspective view of an embodiment of a robotic vehicle having a visual inspection module.
FIG. 9B is a perspective view of the embodiment shown in FIG. 9A which lacks the visual inspection module

The robotic vehicle 510 can be configured to perform multiple inspection functions through the use of various modules that can be mounted to the vehicle. FIG. 9A is a perspective view of an embodiment of a robotic vehicle with a visual inspection module 550. In the embodiment depicted the visual inspection module includes a camera 551 coupled to a controllable boom arm 552. The inspection module can further include one or more sensors (not shown) that can detect corrosion on or in the inspected surface. For example, the one or more sensors can detect changes in surface characteristics, chemical changes, and/or changes in thickness of the material. In certain embodiments, the robotic vehicle can further include an ultrasonic inspection module 553. In certain implementations, the ultrasonic inspection module 553 has a dry coupled ultrasonic probe 554. The use of a dry coupled probe 554, as opposed to a wet coupled probe that requires a water source, eliminates the need for an attached water conduit, thereby increasing the mobility of the robotic vehicle. The ultrasonic inspection module 553 can also include an adaptable mount 555 for maintaining the ultrasonic probe in a position that is normal to the traveling surface as the vehicle travels along complex trajectories (e.g., helical sweep paths) along the surface of a structure. FIG. 9B is a perspective view of the embodiment shown in FIG. 9A without the visual inspection module. The dry coupled probe 554, when positioned proximate to an inspected surface, can be used to make direct determinations of wall thickness (and thus, metal loss) of steel surfaces. More specifically, the probe 554 can detect material thickness, faults, and anomalies in the material, including, but not limited to, corrosion and cracks.

A gas sensor module (not shown) can also be mounted on the vehicle. The gas sensing module can measure the concentration of different gases. Communication to the vehicle can be achieved through wireless communication links without a cord or a tether which helps in increasing mobility by avoiding entanglement. Different modes are available to the operator. In one mode, the operator has full manual control over the vehicle to drive it up to the area to be inspected. In a second mode, the vehicle can autonomously drive around the pipe in a helical path to provide a full corrosion map of that area using the UT probe.

Figure 10:
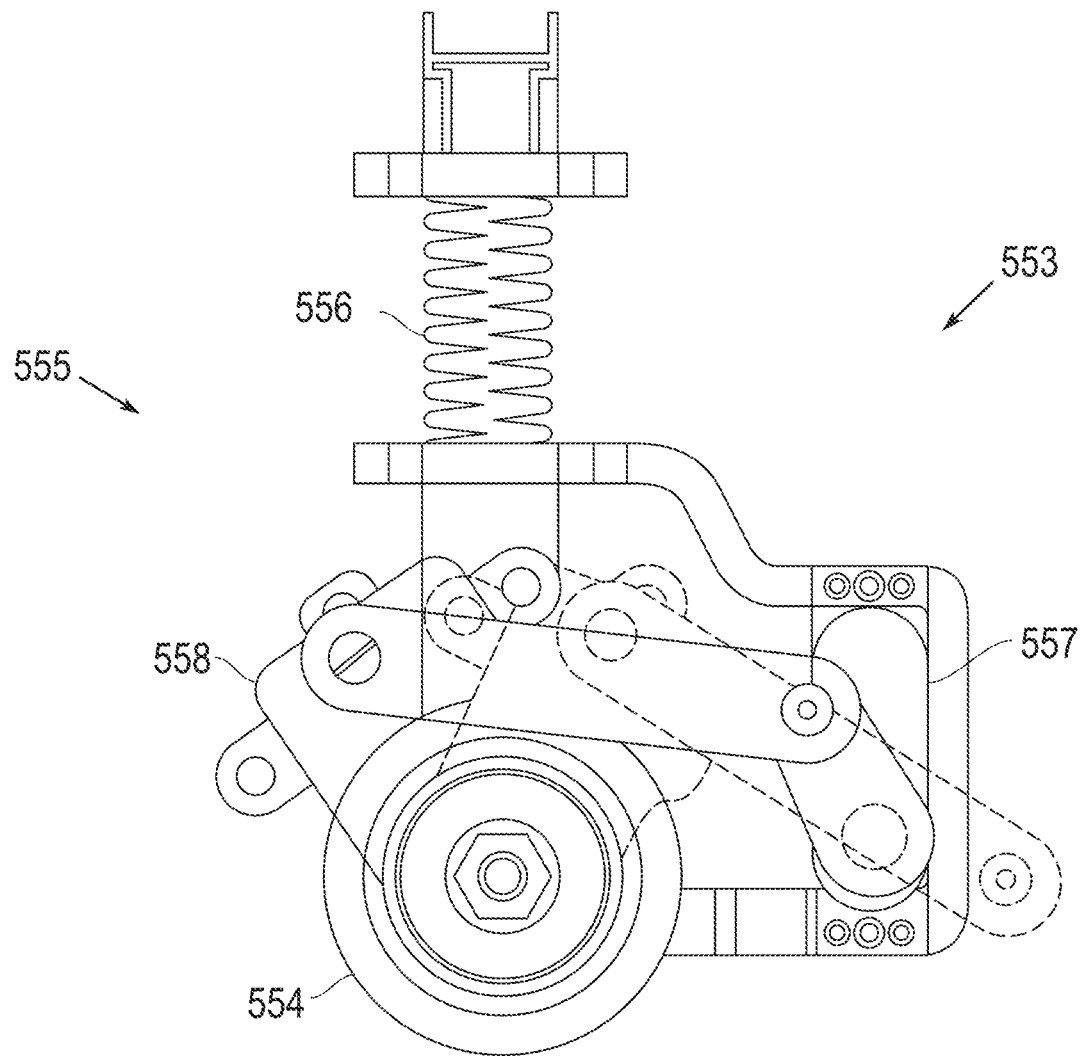
FIG. 10 is a plan view of an embodiment of an adaptable mount for an ultrasonic inspection module that can be used with a robotic vehicle in connection with one or more methods according to the present disclosure.

Referring to FIG. 10, an embodiment of the adaptable mount 555 of an ultrasonic inspection module 553 is shown. The adaptable mount 555 includes a spring loaded linear actuator 556 that exerts a force upon the dry-coupled wheel probe 554 for maintaining the probe in contact with the surface to be inspected. A four-bar linkage system 558 permits wheel probe 554 to move and adjust to the surface that is being inspected so that the probe can remain normal to the inspection surface for optimal performance of the probe (the dashed and solid lines of the four-bar linkage represent two possible positions of adjustment). The wheel probe 554 can be mounted on a mobile platform to make the inspection task more accurate and easier for the operator. The wheel probe 554 includes an axle with a transducer that is centered and enclosed by a tire made of synthetic rubber that has acoustic impedance similar to gel or water. Optionally, the probe can also be filled with liquid couplant that transmits the signal to the enclosing rubber. In addition, various other probes can be used, including conventional probes and high temperature probes. In the case that a selected probe requires a "wet" interface with material being inspected, a mechanism for applying a couplant or a transmissive fluid, e.g., a gel or oil, can be provided. The fluid application mechanism can be incorporated into the vehicle design and remotely controlled by the vehicle controllers for dispensing of the couplant. The fluid application module can have a reservoir, an actuator, and a dispensing port, for example. In response to a control signal, the actuator can cause couplant to be moved from the reservoir and dispensed through the dispensing port to the surface being inspected.

The dry coupled probe 554 can be maintained in a position normal to the inspection surface by using a servo motor 557 to control the orientation of the crystal in the UT probe and the spring-loaded linear actuator 556 to apply the appropriate force on the probe during inspection and lift it from the surface while not in use. This mounting mechanism does not use any supporting wheels around the probe to minimize footprint, size and weight even though they can be added if needed. The servo motor 557 is connected to the probe shaft through the four-bar linkage 558 to control its angular displacement with respect to the assembly. It should be noted that the rubber wheel of the probe rolls can freely on its shaft and thus an ordinary position servo motor is enough to perform the angular adjustments to achieve normalization on the curved surface. The linear actuator 556 is adapted to lift the probe off the surface while inspection is not being performed to reduce rubber wear and protect it from lateral dragging or, during inspection, to compress the spring which in turns applies an appropriate compression force on the probe to get the desired UT signal. This mechanism is capable of adjusting to different structure diameters while moving from longitudinal to helical to radial scanning on the same structure.

Figure 8:
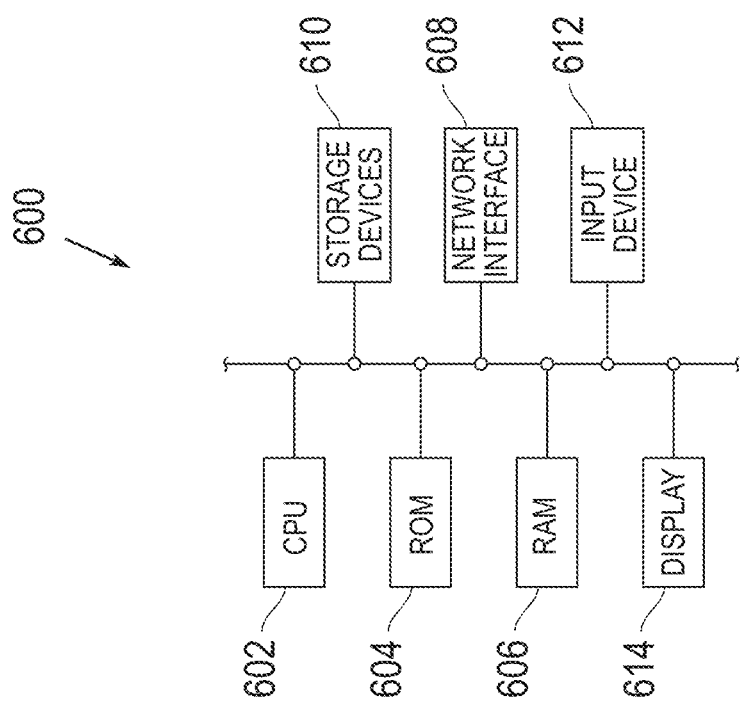
FIG. 8 is a schematic block diagram of an embodiment of an information processor that can be included in a robotic vehicle used to implement one or more methods according to the present disclosure.

A method for determining the orientation of the vehicle can be performed by a computer having a processor with memory for executing code. The robotic vehicle can include an information processor 600, shown as a block diagram in FIG. 8, for controlling operation of the vehicle. The information processor 600 includes one or more processing units 602 (central processing units (CPUs) or microcontrollers) that are configured to execute program instructions stored on one or more memory units, including but not limited to a read only memory (ROM) 604 and random access memory (RAM) 606. One or more network interfaces 608 are adapted to transmit and receive data over a communication network. Instructions can be sent from an operator to the robotic vehicle remotely via the network interfaces 608 and the robotic vehicle can transmit data to the operator over the same interfaces. The information processor 600 can also include further storage components 610 such as a hard disk drive, flash memory, CD-ROM or DVD drive, one or more input devices 212 such as a keyboard, mouse, track ball and the like, and a display 214.

Figure 12:
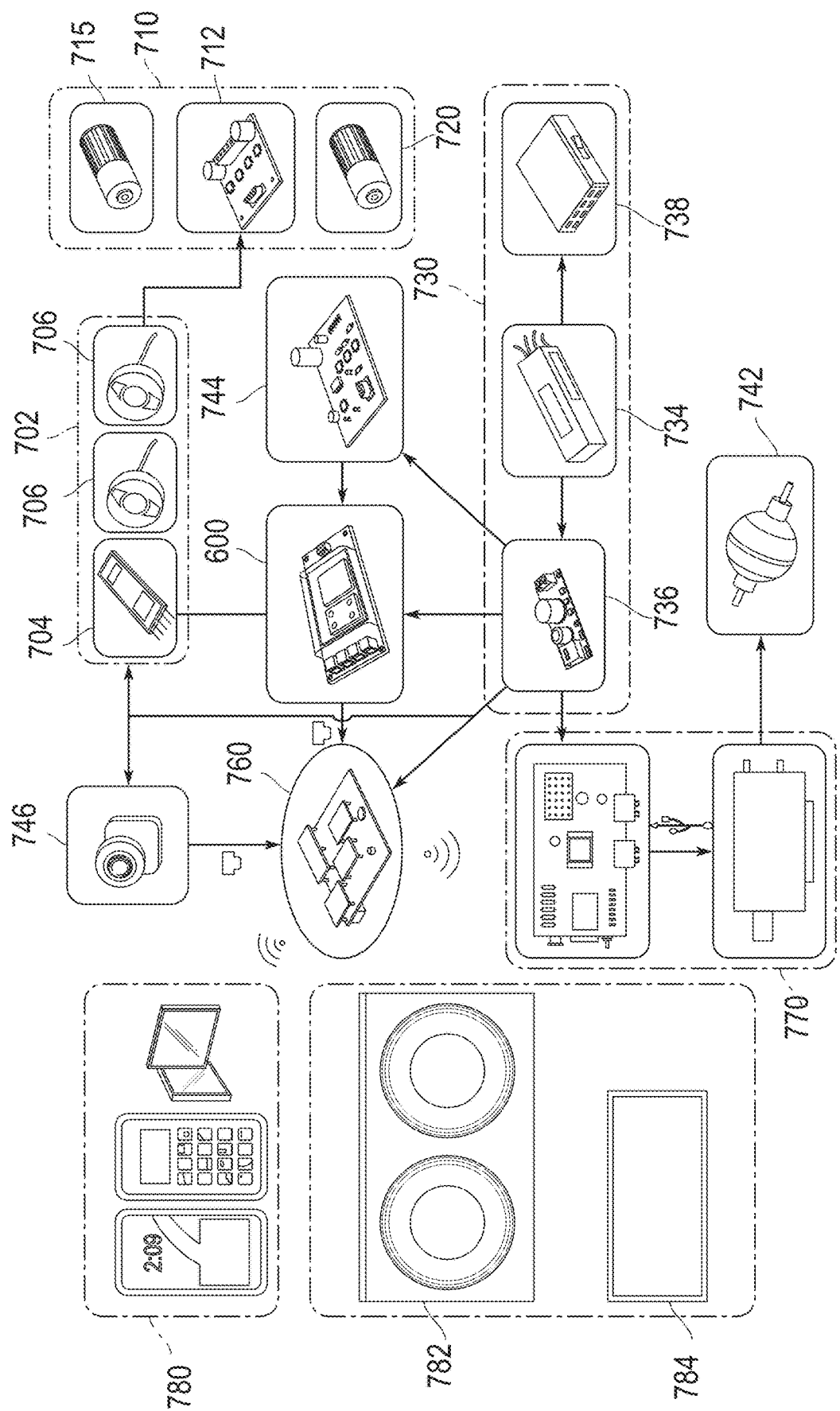
FIG. 12 is a schematic block diagram of an embodiment of a control system for operating the robotic vehicle in connection with one or more methods according to the present disclosure.

FIG. 12 is a schematic block diagram of an exemplary control system 700 for the robotic vehicle 510. The control system 700 has several elements that are positioned in or on the robotic vehicle including the information processor 600 (FIG. 6). The information processor 600 is configured to store and execute software code (e.g., one or more applications) for coordinating various subsystem modules and controlling the operation of the robotic vehicle. Each subsystem module can include program code instructions executable by the information processor and other components, such as specialized circuits, sensors, actuators and electromechanical elements for performing certain related sets of tasks. Among the subsystem modules is a navigation system 702. The navigation system 702 can include one or more inertial sensors 704 to determine the position of the vehicle. The navigation system 702 can further include encoders 706 for monitoring a number of rotations of the driving and steering wheels of the vehicle. A further angular sensor can be used to measure the angle between the two chassis sections of the robotic vehicle to determine the orientation of the vehicle with respect to a curved surface, as discussed above. The processor 600 processes data collected from the navigation system and to generate output signals for a motion system 710. The motion system 710 include a motion controller module 712 that controls the operation of the driving motor 715 and steering motor 720 in order to control the trajectory of the vehicle.

The control system 700 can include a power system 730 having a battery 734. A low voltage converter 736 (e.g., 5V DC) can provide power to the electronics of the system (e.g., the microcontroller, wireless communication system, sensor modules, etc.). A second converter 738 can be used to provide higher voltages (e.g., 12V DC) to other systems of the vehicle (e.g., motors). As such, the vehicle power module can include either rechargeable or non-rechargeable batteries. Alternatively, in a configuration that includes a tether, the power module can receive power from an outside source from the tether. A single power module can be provided that conditions the power for all the other modules on the vehicle that require power. A plurality of power modules can also be provided such that each module that requires power can have a power module associated with it so that each module can condition and deliver power to its respective module. The power modules can also be integrated into each of the modules that require the power, for example.

The control system 700 can also include a plurality of inspection and remediation modules, such as an ultrasonic inspection module 742, a gas detection module 744, a visual inspection camera 746, as well as others, for example a robotic arm module (not shown). Each of the modules 742, 744, 746 includes sensors for detection and monitoring and can also include actuators and tools (robotic arms, pincers, holders, pliers, presses, nozzles, blades, welding implements, etc.) for performing remediation tasks on pipe surfaces including cutting, inserting, coating, and welding. Each modules also can include the necessary electronics, controls, and electromechanical elements to operate the module. Modules 742-746 can communicate with the information processor 600 either directly through wired connections or through a wireless router 760. The inspection modules can have integrated wireless communication capability. Alternatively, the inspection module can use a transfer module 770 that renders the collected inspection data suitable for wireless transmission.

A remote user interface 780 positioned remotely from the robotic vehicle can be configured to send and receive wireless signals from the robotic vehicle. The robotic vehicle can utilize wireless communication protocols (e.g. WiFi, RF, Zigbee) to receive commands from an operator and to send back live video feed and inspection data (e.g. thickness measurement, gas concentration, etc.). For example, the remote user interface 780 can include an application running on a computer, laptop, personal digital assistant, smart phone, tablet, or other suitable device, or can be rendered as a page in a conventional browser application. Accordingly, the remote user interface 780 can receive inspection and location data collected by the robot and display that information on a display 782. The remote user interface 780 can also include a control interface 784 (e.g., a touch screen control interface, or a more traditional physical control interface using buttons and joystick, etc.) to allow the user to wirelessly send instructions to the vehicle to either control its motion and/or its inspection and remediation modules.

As an example, in operation, the information processor 600 of the robotic vehicle can receive command instructions from the remote user interface 780 to advance the vehicle to a certain location and, once at that location, perform an inspection protocol. More specifically, the information processor 600 can control the motor systems 710 to advance the vehicle to the target location and receive information from the navigation system 702 to confirm the location of the vehicle and adjust the control of the motors to accordingly to arrive at the target location. The inspection protocol can include a stored set of instructions that when executed by the information processor cause the motor system and various modules to perform inspection tasks. Once at the target location, the information processor can control the motor system 710 to move the vehicle in an inspection sweep pattern, which can be a helical pattern around a curved surface (e.g., the exterior of a pipe), for example. While the vehicle is moving in the sweep pattern, the information processor 600 can interact with and control the plural inspection modules to perform their respective inspection data collection operations. The information processor 600 can then collect the data received from a respective inspection module and associate that inspection data with data collected from the navigation system 702. In this way, the information processor can associate the inspection data collected with a specific location at which that data was collected. Thus, the information processor can create a multimodal data point that can include inspection data and corresponding location data. These multimodal data points can be transmitted wirelessly to the user interface 780 and displayed to the user. The data points can be displayed in the form of a map that shows the location and results of the inspection data. Inspection data from multiple inspection modules can be associated the location data. For example, the map could include UT data, gas detection data, and visual image data collected for each location point over which the vehicle traversed.

Referring again to the metal loss estimation method discussed above in association with FIG. 1-4, in certain embodiments consistent with the disclosure, the method can be used to generate a geographical heat map that indicates, in a two or three-dimensional map, those structures, or parts of structures, that have a high likelihood of failure due to metal loss. The heat map can be presented to the operator through the remote user interface 780. The operator, in view of the heat map, can send a dispatch instruction to the control system 700 of a robotic vehicle that causes the robotic vehicle to one or more of the areas high risk locations identified on the heat map. In other embodiments, the heat map can comprise calculations which are used by a programmed device to send the dispatch instruction to the control system 700 without operator input.

Once at one of the high-risk locations, the robotic vehicle can be instructed, by remote commands or pre-programmed instructions, to perform a set of remediation tasks. The remediation tasks can include confirming the amount of metal loss at the high-risk location through non-invasive inspections (ultrasound, infrared, visual, etc.). In certain embodiments, the robotic vehicle can include further remediation tools to aid field tech personnel in fixing high-risk structures, particularly in locations that are difficult to access by human personnel. For example, the robotic vehicle arm module can be equipped with detachable cutting and welding tools that enable the robotic vehicle repair sections of pipe that have lost a great deal of metal and are at risk of failure. For example, the robotic vehicle can carry sections of pipe that can be welded directly to the surface of a pipe in a "patching" procedure to increase the thickness of the pipe in a localized high-risk location. The features that provide stability to the robotic vehicle, including the magnetic elements it contains are particularly useful in remediation procedures in which the robotic vehicle remains in a fixed location while performing tasks such as cutting, welding and patching.

More generally, the robotic vehicle can carry out variety of different tasks via multiple detachable modules. As noted above, these modules can include visual inspection using a camera(s), UT inspection module using a pulser and a dry-coupled probe (or other types of UT probes such as conventional or high temperature probes), a gas sensing module, and a robotic arm module that can be equipped with a variety of tools, for example. Using these modules, the robotic vehicle can perform a number of additional tasks apart from inspection and mirror repair including, but without limitation, preparing surfaces, physically marking a location of fixed or ongoing defect or high-risk location via a visual marker such as paint or a physical marker, and coating or painting. For example, a marking module can include a reservoir of marking material (e.g., paint, dye, or other detectable material) and can receive signals that cause the marking module to dispense the marking material at the desired location. The marking module can mark locations that have been confirmed as in need of critical repair. In addition, the marking module can include several separate reservoirs of differing marking material in order to indicate differing conditions (e.g., requiring immediate attention, requiring attention but not immediate attention, etc.).

The robotic vehicle module has multiple mounting points allowing different modules to be connected to it. A standardized interface can be used that can provide for physical mounting of the modules as well as electronic coupling for power, control, and data transfer between the module and the other components of the vehicle. The modules can be directly connected to the chassis or indirectly connected to the chassis by, for example, being connected supported by other modules or through additional linkages. Preferably, the steering module containing the magnetic omni-wheel is attached to the back of the driving module to create the omni-wheel vehicle described above. However, different configurations are also attainable by attaching two driving modules side-by-side using 2 hinges to create a differential steering vehicle that can steer by changing the speed or direction of the two driving wheels. Other configurations include a snake/ring that can be achieved by attaching multiple driving and steering modules either in one line to create a snake-like configuration or in a loop to create a ring-like configuration.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for predicting and remediating metal loss in a structure having a specific component type and size, comprising:
    predicting, using a trained machine learning model based upon historical data, metal loss over locations of the structure at a time of prediction;
    generating a three-dimensional visualization of the structure including an overlay depicting a magnitude of predicted metal loss over the sections of the structure at the time of the prediction, the overlay identifying from among the predicted locations a high-risk location on the structure in which magnitude of metal loss indicates potential remediation being needed;
    dispatching a robotic vehicle to the high-risk location on the structure; and
    using the robotic vehicle, inspecting the high-risk location to confirm whether the magnitude of metal loss at the location requires remediation;
    wherein the machine learning model is trained using historical data specific to the specific component type and size of the structure, and
    wherein each component type has a distinct structural shape.

2. The method of claim 1, further comprising performing at least one remediation action to improve a condition of the high-risk location using the robotic vehicle.

3. The method of claim 2, wherein the remediation action is at least one of depositing a coating over the structure at the high risk location and increasing a thickness of the structure at the high-risk location by adding metallic material to the structure at the location.

4. The method of claim 1, wherein the historical data upon which prediction of the amount of metal lost is based includes: spatial maps of measured wall thicknesses over time, material composition, operating conditions for structures of the same type and size, or a combination of the foregoing.

5. The method of claim 1, wherein the structure is a pipe component.

6. The method of claim 1, wherein the robotic vehicle dispatched to the high-risk location on the structure comprises:
    a chassis;
    a first motion module including a first wheel mounted to the chassis for rotation about a first axis;
    a second motion module including a second wheel mounted to the chassis, the second wheel being arranged to rotate about a second axis that is at an angle to the first wheel for orthogonal rotation with respect to a rotation direction of the first wheel;
    an inspection module connected to the chassis and configured to collect inspection data related to the vehicle's environment;
    a control module connected to the chassis and configured to receive the inspection data,
    wherein the control module is configured to prepare the inspection data for transmission.

7. The method of claim 6, further comprising using a navigation module to determine a location of the robotic vehicle relative to the structure as part of the dispatching step.

8. The method of claim 6, further comprising equipping and using at least one of a visual inspection module, an ultrasonic inspection module, and an infrared inspection module in connection with the inspecting step.

9. The method of claim 6, further comprising, performing at least one remediation action to improve a condition of the high-risk location using a remediation module of the robotic vehicle, the remediation module including a robot arm and at least one of a cutting tool, a welding tool and a spraying tool.

10. The method of claim 1, wherein the overlay is configured to appear when the operator hovers over a section of the structure using an interface device.

* * * * *